No. 699,583. Patented May 6, 1902.
H. H. SHERK.
MEANS FOR AUTOMATIC CONTROL OF MOTOR VEHICLES.
(Application filed Nov. 5, 1901.)
(No Model.) 2 Sheets—Sheet 1.
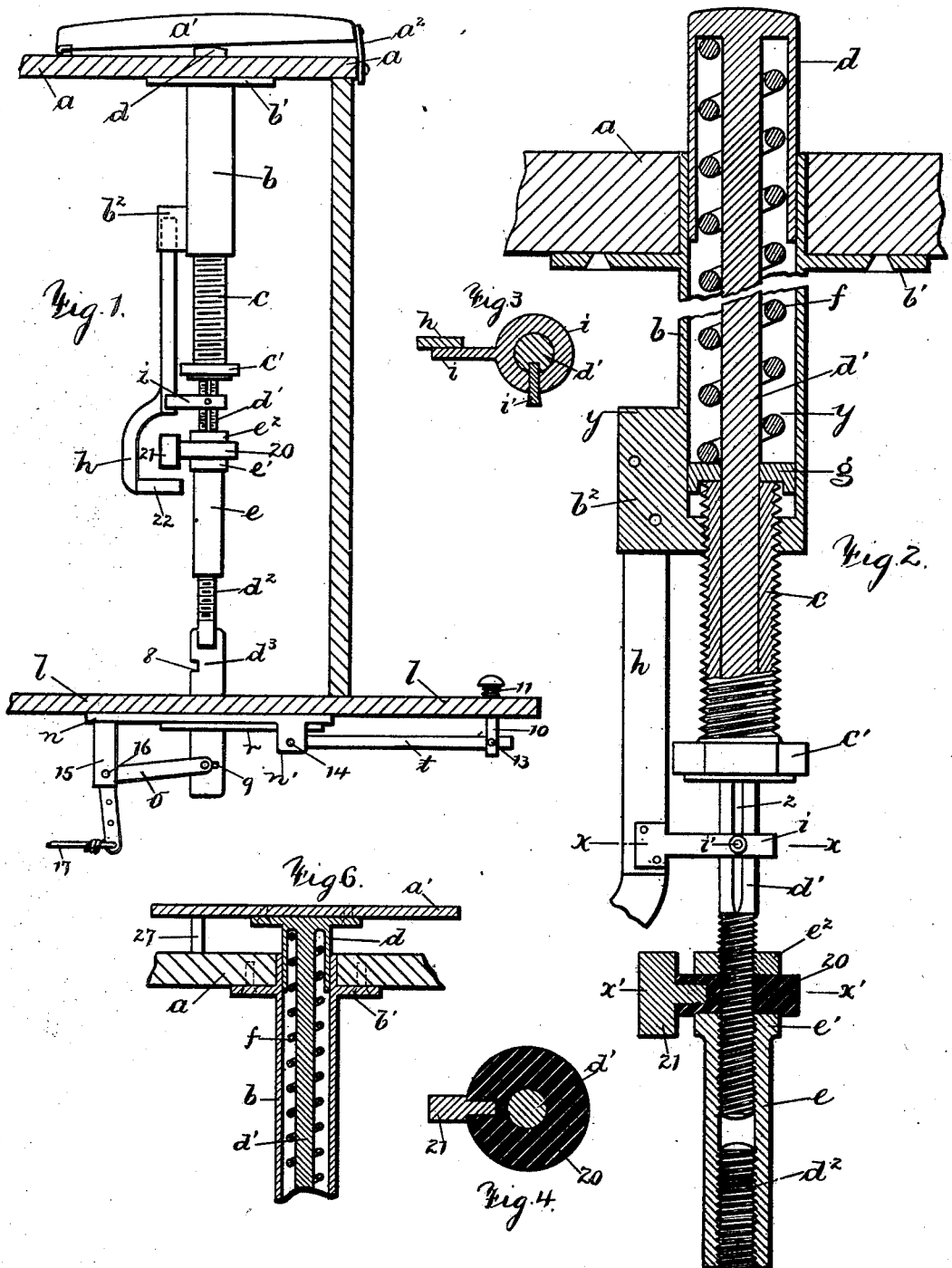

No. 699,583. Patented May 6, 1902.
H. H. SHERK.
MEANS FOR AUTOMATIC CONTROL OF MOTOR VEHICLES.
(Application filed Nov. 5, 1901.)
(No Model.) 2 Sheets—Sheet 2.
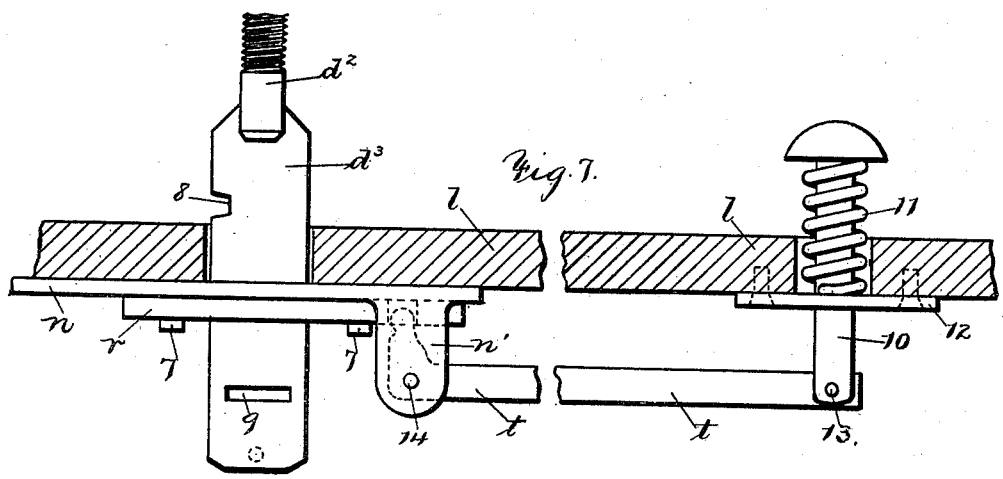
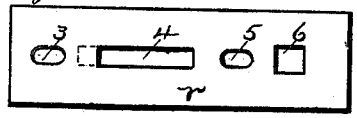
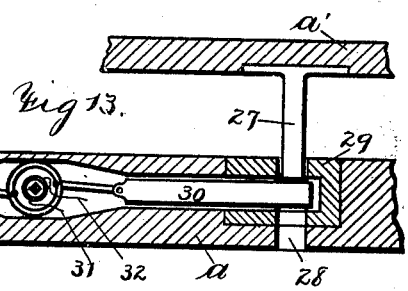
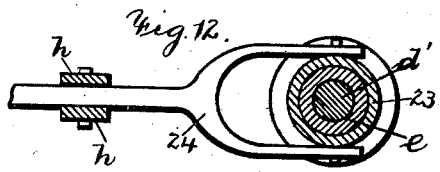
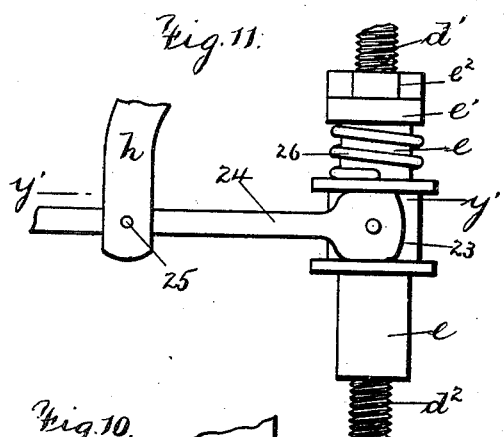
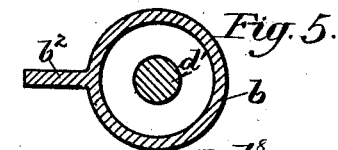
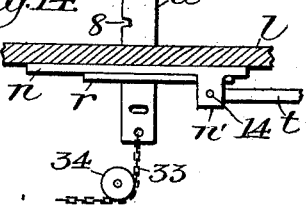
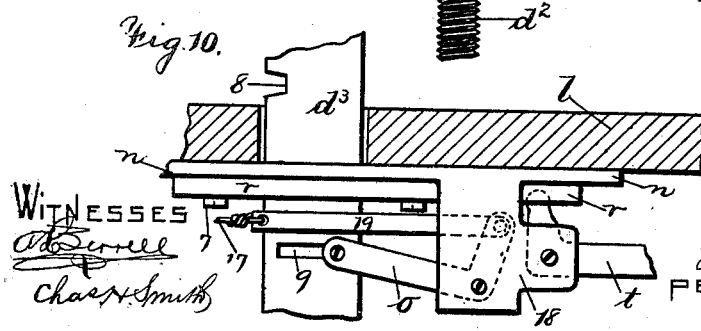

UNITED STATES PATENT OFFICE.

HENRY H. SHERK, OF PASADENA, CALIFORNIA.

MEANS FOR AUTOMATIC CONTROL OF MOTOR-VEHICLES.

SPECIFICATION forming part of Letters Patent No. 699,583, dated May 6, 1902.

Application filed November 5, 1901. Serial No. 81,179. (No model.)

*To all whom it may concern:*

Be it known that I, HENRY H. SHERK, a citizen of the United States, residing at Pasadena, in the county of Los Angeles and State of California, have invented an Improvement in Means for the Automatic Control of Motor-Vehicles, of which the following is a specification.

My invention relates to all classes of motor-vehicles wherein the power employed to propel the vehicle is turned on or shut off by devices actuated by and in conjunction with a movable seat whereby the weight of the driver on the seat operates the said devices and turns the power on, and when the driver leaves the seat or is accidentally thrown therefrom the said devices operate automatically to shut the power off.

In carrying out my invention I provide means operated with and by the aforesaid devices for automatically applying the brake when the power is shut off by the driver's weight being removed from the seat, means for holding the power-connecting devices in operative position should the driver so desire when he rises from his seat without leaving the vehicle—as, for instance, if he should want to stand and still keep the power on. I also provide means for locking the seat with the devices in an operative position, all of which will be hereinafter more particularly described.

In the drawings, Figure 1 is a general elevation of my invention, showing a portion of a vehicle-body in section. Fig. 2 is a section and partial elevation of the power-connecting devices. Fig. 3 is a section on the line $x\ x$ of Fig. 2. Fig. 4 is a section on the line $x'\ x'$ of Fig. 2. Fig. 5 is a section on the line $y\ y$ of Fig. 2. Fig. 6 shows a modified form with the plunger directly connected to the seat. Fig. 7 is an elevation of the clamping mechanism. Fig. 8 is a plan of the slide-plate, and Fig. 9 is a longitudinal section of the same. Fig. 10 is an elevation showing a modified form of the clamp and brake devices. Fig. 11 is a modification of the power-operating devices. Fig. 12 is a section on line $y'\ y'$ of Fig. 11. Fig. 13 is a section and partial elevation showing the seat-locking mechanism at right angles to the position Fig. 1. Fig. 14 shows a modification of the brake mechanism shown in Fig. 1. Figs. 2 to 14, inclusive, are shown on a larger scale than Fig. 1.

I secure a tubular casing $b$, by its flange $b'$ and screws, to the under side of the seat-frame $a$. The upper end of the casing $b$ is open and preferably extends through the seat-frame $a$, and the lower part of the same is provided with a side lug $b^2$, the purpose of which will be hereinafter set forth. The lower end of the casing $b$ is tapped to receive the screw-sleeve $c$, which latter is provided with an integral bolt-head $c'$ to facilitate the turning of the screw-sleeve.

The plunger $d$ is tubular and fits the upper end of the casing $b$, and upon the same the seat $a'$ rests, and the plunger $d$ is provided with a rod $d'$ passing through the casing $b$ and the screw-sleeve $c$. The lower end of the plunger-rod $d'$ is preferably provided with a thread to screw into the coupling $e$. A spiral spring $f$ is within the casing $b$ and plunger $d$, and while the upper end bears upon the plunger the lower end bears upon the washer $g$, which fits around the plunger-rod $d'$ and within the casing $b$ and rests upon the end of the screw-sleeve $c$. From Fig. 2 it will be apparent that by this construction the compression of the spring $f$ may be quickly and readily adjusted for various weights on the seat by the rotation of the sleeve $c$. The seat $a'$ may be hinged to the seat-frame, as shown in Fig. 1, or the upper end of the plunger may be flanged and secured directly to the seat by means of screws, as shown in Fig. 6. The seat $a'$ may be conveniently prevented from being raised too high by a stop $a^2$, secured thereto and sliding on a pin in the frame $a$.

Referring to Figs. 2 and 3, the plunger-rod $d'$ is provided above its threaded end with a groove 2, which necessarily must be of a greater length than the distance through which the plunger moves. To the lug $b^2$ a bar $h$ is secured and extends downward. A collar $i$ fits over the plunger-rod $d'$ below the bolt-head $c'$ and is secured to the bar $h$ and is provided with a pin $i'$, passing through the collar and into the groove 2 in the plunger-rod. The collar acts as a guide for the plunger-rod and the pin keeps the same from turning.

The pin, however, need not be employed in the form of device shown in Fig. 6.

The coupling $e$ has a bolt-head $e'$, and its lower end is preferably tapped for a threaded rod. The divisional extension $d^2$ of the plunger-rod is provided with a thread and screws into the lower end of the coupling $e$.

$l$ represents the floor of the vehicle, to the under side of which I secure a metal plate $n$. $r$ is a sliding lock-plate having openings 3, 4, 5, and 6 and held in position by screws 7 passing through the holes 3 and 5 and upon which the plate $r$ slides.

That part $d^2$ of the plunger-rod is extended by a flattened portion $d^3$, which may or may not be integral with the section $d^2$ and has a notch 8 in one edge and a transverse slot 9 near the end. This flattened portion of the plunger-rod preferably passes through the floor of the vehicle, the plate $n$, and the mortise 4 in the lock-plate $r$. The foot-actuated post 10 also passes through the floor of the vehicle and a plate 12, secured thereto, and is held in a normal position by the spring 11 bearing upon the plate 12. The long arm of the angle-lever $t$ is pivoted at 13 to the post 10 and at 14 to a bracket-lug $n'$, forming part of the plate $n$. The short arm of the lever $t$ has a rounded end which fits snugly into the opening 6 in the lock-plate $r$. The parts are so adjusted that when the plunger and rod are down the notch 8 comes opposite the slide-plate $r$. Hence by depressing the post by the foot the slide-plate $r$, by the lever $t$, is caused to move and engage the notch 8, and the parts may be so held as long as the pressure is applied to the post 10. The pressure being released, the spring 11 causes the slide-plate $r$, lever $t$, and pedal-post 10 to return to their normal positions. The plate $r$ is preferably beveled at $r'$ at the end of the mortise 4 coming next to the edge of the plunger $d^3$, having the notch 8, to insure a more perfect connection and easy separation between the plate $r$ and notch 8. The plate $n$ is also provided with a bracket 15, (see Fig. 1,) to which a bell-crank lever $o$ is pivoted at 16. One arm of the lever $o$ is provided with a pin, which passes through the transverse slot 9 in the plunger-rod $d^3$. The other arm of the bell-crank lever $o$ is connected to the brakes by a rod or rope 17 or other equivalent device, by which when the plunger devices are depressed the brakes are released, and vice versa. In many motor-vehicles the floor does not extend under the whole of the carriage, and particularly is this true in most vehicles using steam or gasolene as motive power. Consequently in these vehicles there is no support for the brake-operating mechanism to the rear of the plunger-rod, in which case the brackets $n'$ and 15, Fig. 1, may be replaced by common bracket-lugs 18, Fig. 10, placed to the front of the plunger and to which both the bell-crank lever $o$ and lever $t$ are pivoted.

A metal strip 19, forming a link and pivoted to the free arm of the bell-crank lever, may be employed and extend to the rod 17. Instead of the devices just described a chain 33 may be secured to the lower end of the plunger $d^3$ and passed over a pulley 34 to the brake mechanism to operate the same. (See Fig. 14.)

With vehicles to be driven electrically I provide a disk of insulating material 20, carried by the lower part of the plunger-rod $d'$, between the coupling-head $e'$ and a lock-nut $e^2$. A contact 21 is set in this disk 20 and is adapted to close the circuit between the motor and the source of electricity by bearing on the terminals 22 when the plunger is depressed. These terminals are preferably carried by the arm $h$ or may be supported in any desired manner.

In vehicles driven by steam, gasolene, &c., I provide a collar 23, which slides on the coupling $e$. (See Figs. 11 and 12.) A lever 24 is pinned to this collar and pivoted to the lower end of the bar $h$ at 25. The free end of the lever 24 operates devices located between the source of power and the motor for turning on and off the power-supply.

Between the top of the collar 23 and the bolt-head $e'$, Fig. 11, I prefer to employ a spring 26. The tension of this spring is such and the parts are so arranged that in the descent of the plunger the spring is completely compressed upon the top of the collar 23 before the collar is moved, during which part of its downward movement the plunger merely operates to release the brake mechanism. In its further downward movement the plunger carries the collar 23 with it, which operates the lever 24 to admit the power to the motor, which admission of power is then regulated by independent means. When the weight is removed from the seat, the valves or other power-admission devices are automatically closed and the collar 23 and lever 24 return to their normal position (shown in Fig. 11) as the plunger rises, the function of the spring being to reduce to a minimum the variations in the power-supply due to slight changes in position of the plunger caused by jolting. The lever 24 might be pinned directly to the coupling $e$; but it is desirable to employ the sliding collar, as described, because in so doing the power supplied to the motor is not varied with every slight change of position of the plunger devices, it being necessary that the plunger should rise about half its movable distance before the lever is acted upon sufficiently to shut off the power.

Referring to Fig. 13, I provide the seat $a'$ with one or more posts 27, adapted to fit and move in an opening 28 in a metal block 29, let into the seat-frame $a$. A lock, preferably placed in the front of the seat-frame, where it may be easily reached by the operator whether he is in or out of the vehicle, may be constructed on the principle of a double mortise-bolt. The bolts 30 when moved outward extend across the opening 28 and prevent the lowering of the seat, and consequently the operation of the power-connecting mechanism. The lock may be operated in any well-known manner.

In many motor-vehicles using gasolene as a motive power it is necessary to start the motor before entering the vehicle. In this case I may close an auxiliary sparking-circuit by the key which unlocks the seat through the wires 31 and 32. It will be apparent that the main sparking-circuit may be operated by devices such as the insulating-disk 20 and contacts 21 and 22. (Shown in Figs. 1 and 2.) The length of the plunger device may be varied within limits by the coupling e to adjust the movement of the power-operating devices to their correct working relations.

It is to be understood that my invention is applicable to all classes of motor-vehicles irrespective and independent of the hand-operated devices employed to regulate and control the immediate supply of power to the motor.

I claim as my invention—

1. In a motor-vehicle, the combination with a movable seat and a plunger device operated thereby, of means for causing the said plunger device to press against the said seat, means for regulating the aforesaid means, means for guiding the said plunger device, means for keeping the plunger device from turning, and means connected to and actuated by the said plunger device to turn on the power when the plunger device is depressed and to automatically shut off the power when the plunger device is raised, substantially as set forth.

2. In a motor-vehicle, the combination with a movable seat and a plunger device operated thereby, of means for causing the said plunger device to press against the said seat, means for regulating the aforesaid means, means for guiding the said plunger device, means for keeping the plunger device from turning, means connected to and actuated by the said plunger device to turn on the power when the plunger device is depressed and to automatically shut off the power when the plunger device is raised, and means independent of the seat for holding the plunger device down in operative position, substantially as set forth.

3. In a motor-vehicle, the combination with a movable seat and a plunger device operated thereby, of means for causing the said plunger device to press against the said seat, means for regulating the aforesaid means, means for guiding the said plunger device, means for keeping the plunger device from turning, means connected to and actuated by the said plunger device to turn on the power when the plunger device is depressed and to automatically shut off the power when the plunger device is raised, means independent of the seat for holding the plunger device down in operative position, and means connected to and actuated by the said plunger device to operate a brake, substantially as set forth.

4. In a motor-vehicle, the combination with a movable seat and a plunger device operated thereby, of means for causing the said plunger device to press against the said seat, means for regulating the aforesaid means, means for guiding the said plunger device, means for keeping the plunger device from turning, means connected to and actuated by the said plunger device to turn on the power when the plunger device is depressed and to automatically shut off the power when the plunger device is raised, means independent of the seat for holding the plunger device down in operative position, means connected to and actuated by the said plunger device to operate a brake, and means for locking the seat when the same is raised, substantially as and for the purposes set forth.

5. In a motor-vehicle, the combination with a movable seat and a tubular casing attached to the seat-frame, of a plunger device passing through the said casing and borne upon and actuated by the said seat, a spring within the said casing to keep the plunger against the seat, means for varying the tension on said spring, means for adjusting the length of the said plunger device, and means connected to and actuated by the said plunger device to connect the power with the motor when the plunger device is depressed and to disconnect the power from the motor when the plunger device is raised, substantially as set forth.

6. In a motor-vehicle, the combination with a movable seat and a tubular casing attached to the seat-frame, of a plunger device passing through the said casing and borne upon and actuated by the said seat, a spring within the said casing to keep the plunger against the seat, means for varying the tension on said spring, means for adjusting the length of the said plunger device, means for keeping the plunger device from turning, and means connected to and actuated by the said plunger device to connect the power with the motor when the plunger device is depressed and to disconnect the power from the motor when the plunger device is raised, substantially as set forth.

7. In a motor-vehicle, the combination with a movable seat and a tubular casing attached to the seat-frame, of a plunger device passing through the said casing and borne upon and actuated by the said seat, a spring within the said casing to keep the plunger against the seat, means for varying the tension on said spring, means for adjusting the length of the said plunger device, means for keeping the plunger device from turning, means connected to and actuated by the said plunger device to connect the power with the motor when the plunger device is depressed and to disconnect the power from the motor when the plunger device is raised, and means independent of the seat for holding the plunger device down in operative position, substantially as set forth.

8. In a motor-vehicle, the combination with a movable seat and a tubular casing attached to the seat-frame, of a plunger device passing through the said casing and borne upon and actuated by the said seat, a spring within the said casing to keep the plunger against the seat, means for varying the tension on said spring, means for adjusting the length of the said plunger device, means for keeping the plunger device from turning, means connected to and actuated by the said plunger device to connect the power with the motor when the plunger device is depressed and to disconnect the power from the motor when the plunger device is raised, means independent of the seat for holding the plunger device down in operative position, and means connected to and actuated by the said plunger device to set a brake when the plunger device is raised, substantially as specified.

9. In a motor-vehicle, the combination with a movable seat and a tubular casing attached to the seat-frame, of a plunger device passing through the said casing and borne upon and actuated by the said seat, a spring within the said casing to keep the plunger against the seat, means for varying the tension on said spring, means for adjusting the length of the said plunger device, means for keeping the plunger device from turning, means connected to and actuated by the said plunger device to connect the power with the motor when the plunger device is depressed and to disconnect the power from the motor when the plunger device is raised, means independent of the seat for holding the plunger device down in operative position, means connected to and actuated by the said plunger device to set a brake when the plunger device is raised, and means for locking the seat when in a raised position, substantially as specified.

10. In a motor-vehicle, the combination with a movable seat and a tubular casing attached to the seat-frame, of a plunger device passing through said casing and bearing upon and actuated by the said seat, a spring within said casing and acting upon the plunger device to cause the same to bear against the said seat, a washer within the said casing, a screw-sleeve through which the plunger device passes, and by which the tension of said spring is regulated, means for keeping the plunger device from turning, means for varying the length of the plunger device, means connected to and operated by the plunger device for setting a brake when the plunger device is raised, means independent of the seat for holding the plunger device in its operative position, and means for locking the seat when the same is raised, substantially as specified.

11. In a motor-vehicle, the combination with a movable seat and a tubular casing attached to the seat-frame, of a plunger device passing through said casing and bearing upon and actuated by the said seat, a spring within said casing and acting upon the plunger device to cause the same to bear against the said seat, a washer within the said casing, a screw-sleeve through which the plunger device passes and by which the tension of said spring is regulated, a bar connected to the said casing, a collar surrounding the said plunger device and connected to the said bar, a pin in said collar passing into a slot in said plunger device to keep the latter from turning, means for varying the length of the plunger device, means connected to and operated by the plunger device for setting a brake when the plunger device is raised, means independent of the seat for holding the plunger device in its operative position, and means for locking the seat when the same is raised, substantially as set forth.

12. In a motor-vehicle, the combination with a movable seat and a tubular casing attached to the seat-frame, of a plunger device passing through said casing and bearing upon and actuated by the said seat, a spring within said casing and acting upon the plunger device to cause the same to bear against the said seat, a washer within the said casing, a screw-sleeve through which the plunger device passes and by which the tension of said spring is regulated, a bar connected to the said casing, a collar surrounding the said plunger device and connected to the said bar, a pin in said collar passing into a slot in said plunger device to keep the latter from turning, a coupling within which the plunger device is divided, whereby the length of the same may be varied, means connected to and operated by the plunger device for setting a brake when the plunger device is raised, means independent of the seat for holding the plunger device in its operative position, and means for locking the seat when the same is raised, substantially as specified.

13. In a motor-vehicle, the combination with a movable seat and a tubular casing attached to the seat-frame, of a plunger device passing through said casing and bearing upon and actuated by the said seat, a spring within said casing and acting upon the plunger device to cause the same to bear against the said seat, a washer within the said casing, a screw-sleeve through which the plunger device passes, and by which the tension of said spring is regulated, a bar connected to the said casing, a collar surrounding the said plunger device and connected to the said bar, a pin in said collar passing into a slot in said plunger device to keep the latter from turning, a coupling within which the plunger device is divided whereby the length of the same may be varied, a bell-crank lever pivoted to bracket-lugs under the floor of the vehicle and actuated by the plunger device to operate a brake when the plunger device is raised, means independent of the seat for holding the plunger device in its operative position, and means for locking the seat when the same is raised, substantially as specified.

14. In a motor-vehicle, the combination with a movable seat and a tubular casing attached to the seat-frame, of a plunger device passing through said casing and bearing upon and actuated by the said seat, a spring within said casing and acting upon the plunger device to cause the same to bear against the said seat, a washer within the said casing, a screw-sleeve through which the plunger device passes and by which the tension of said spring is regulated, a bar connected to the said casing, a collar surrounding the said plunger device and connected to the said bar, a pin in said collar passing into a slot in said plunger device to keep the latter from turning, a coupling within which the plunger device is divided whereby the length of the same may be varied, a bell-crank lever pivoted to bracket-lugs under the floor of the vehicle and actuated by the plunger device to operate a brake when the plunger device is raised, a slide-plate, through which the plunger device passes, attached to a plate under the floor of the vehicle, a foot-actuated post, a lever pivoted to the said post and in a bracket integral with the said plate, an end of the said lever being adapted to fit into an opening in the said slide-plate whereby when the plunger device is down the slide-plate may be moved along by the depression of the post to engage with a notch in the plunger device to hold the same in operative position, and means for locking the seat when the same is raised, substantially as specified.

Signed by me this 9th day of October, 1901.

HENRY H. SHERK.

Witnesses:
GEO. T. PINCKNEY,
BERTHA M. ALLEN.